UNITED STATES PATENT OFFICE.

WHIPPLE V. PHILLIPS, OF COVENTRY, ASSIGNOR OF ONE-HALF HIS RIGHT TO ROBERT E. SMITH, OF PROVIDENCE, RHODE ISLAND.

IMPROVEMENT IN COMPOSITIONS FOR PIPES AND TUBING.

Specification forming part of Letters Patent No. 146,144, dated January 6, 1874; application filed January 15, 1873.

*To all whom it may concern:*

Be it known that I, WHIPPLE V. PHILLIPS, of Coventry, in the county of Kent and State of Rhode Island, have invented a new and useful Composition for Water-Pipes, Drain-Pipes, and for other purposes; and I do hereby declare that the following specification is a full, clear, and exact description thereof.

The object of my invention is to produce a composition which shall be of such a nature that it can be readily molded into water-pipes, drain-pipes, and other articles of manufacture; and consists in the combination of ingredients hereinafter described.

In the first place, I take iron ore, or iron slag from any furnace, and grind it to a fine powder, which I will call No. 1. In the second place, I take coal-tar, pitch, rosin, or rosin-pitch, and asphaltum, melted together with rosin or tar-oil, in such proportions as will form a tough cement, capable of being ground to powder, and reduce the same to powder, which I will call No. 2. The two powders thus made are then well mixed together, and afterward heated with superheated steam until the compound becomes an adhesive pasty mass, which may be forced into molds of any desired shape.

The proportions in which the powders Nos. 1 and 2 should be mixed depends upon the articles into which the mass is to be molded. For ordinary use, however, I prefer ten parts of the former to one of the latter.

The proportions of the ingredients forming the powder No. 2 are as follows: Equal portions of coal-tar, pitch, rosin or rosin-pitch, and asphaltum, mixed together and melted with one-fortieth part of the weight of rosin or tar-oil.

Articles of manufacture made from this composition—as, for instance, pipes—are much more durable than those made from iron, for the reason that they will not rust or corrode, and can be made at much less expense, as the pulverized iron ore or slag, which forms the basis of the compositions, can be procured at a comparatively slight cost. It also has advantages for piping over cement, for the reason that it is ready for use as soon as it comes from the mold. The time and labor thus saved in its manufacture materially reduces its cost below that of the cement pipe now in use.

What I claim as my invention, and desire to secure by Letters Patent is—

The composition for water and drain pipes, &c., and compounded of the ingredients and in the manner substantially as set forth.

W. V. PHILLIPS.

Witnesses:
   WALTER B. VINCENT,
   NATHANIEL L. MORGAN.